Jan. 8, 1924.
J. RICKER
SAW GAUGE
Filed Nov. 18, 1922
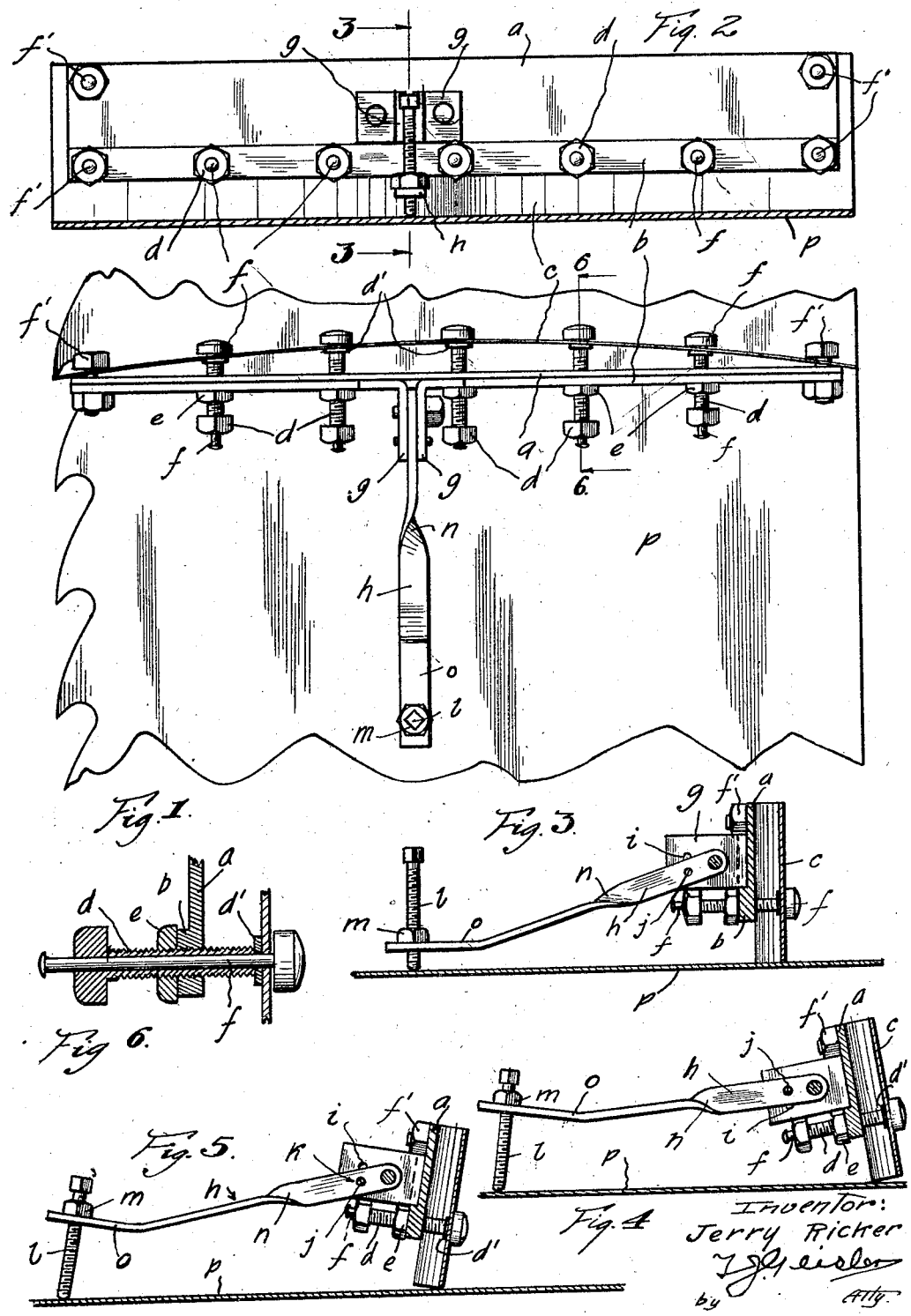

Patented Jan. 8, 1924.

1,479,928

UNITED STATES PATENT OFFICE.

JERRY RICKER, OF ENTERPRISE, OREGON, ASSIGNOR TO E. C. ATKINS & COMPANY, OF INDIANAPOLIS, INDIANA, A CORPORATION OF INDIANA.

SAW GAUGE.

Application filed November 18, 1922. Serial No. 601,788.

*To all whom it may concern:*

Be it known that I, JERRY RICKER, a citizen of the United States, and a resident of Enterprise, county of Wallowa, and State of Oregon, have invented a new and useful Improvement in Saw Gauges, of which the following is a specification.

My invention relates to devices which gauge curved surfaces and more particularly to tension gauges for band or circular saws.

Tension in a saw is the degree to which the center of a saw is lengthened over the teeth edge and the back edge. Band saws are made endless and are adapted to be placed over driven pulleys and lumber is passed underneath. As is well known, unless a tremendous strain is put on these saws the saw will not cut in a straight path but will waver slightly as it cuts thru. To overcome this the centers of the saws are increased slightly in length leaving the cutting edge and the back edge slightly less in over-all length. When the band saw is stretched on the pulleys the outside edges of course will receive the greater strain and thus will be more taut than the center section.

It is necessary that the saw be tensioned uniformly thruout its length, and the gauge which involves my invention is used to measure the difference in tension. When the band saw is removed from the pulleys and is permitted to assume its normal position the part of the saw which is greater in overall length will tend to move outwardly from a straight face. The degree which the saw moves from a straight face is called the degree of tension and as this degree of tension is very slight it is therefore necessary that it be measured accurately.

Saw filers find that in some cases it is preferable that the point which receives the maximum tension will not be exactly in the longitudinal middle of the saw but will be closer to one edge or the other.

It is therefore my specific object to provide a gauge which will measure all degrees of tension and is also adapted to measure the degree of tension whether it be in the longitudinal middle of the saw or not.

I have attained my object in a saw gauge comprising a stock of rigid construction to which is fastened a flexible band which is secured to the stock by a series of spaced screw bolts threaded into the stock and extending thru said band, the nuts of the screw bolts adapted for adjusting the distance between the band and the stock at longitudinally spaced points, whereby the band is flexed to form the desired curves along its length. Means are also provided for tilting the stock at variable angles with a straight surface which permits the device assuming the desired arc or parabola of curvature thereby gaging the degree of tension in a saw.

I have illustrated these and other features in the accompanying drawings, in which:

Fig. 1 is a plan view of my saw gauge resting in position on a portion of the band saw;

Fig. 2 is a side elevation of the same and shows that the gauge is set so that the lower edge of the flexible band forms a straight edge with the saw;

Fig. 3 is a section taken on the line 3—3 of Fig. 2 and shows the flexible band in the same position as in Fig. 2 in that the lower edge of the gauge forms a straight edge;

Fig. 4 is a similar section to Fig. 3 but shows that the lower edge of the gauge forms a curved surface which is concaved in relation to a straight surface;

Fig. 5 is a similar section to Fig. 3 but the flexible blade is tipped oppositely so that the lower edge forms a convex surface in relation to a straight edge; and Fig. 6 is a fragmentary section taken on the line 6—6 of Fig. 1 showing a detail of construction.

My device is made up of a stock $a$ which is of rigid construction and has preferably a longitudinal stiffening rib $b$. A flexible band $c$ is secured to the stock at longitudinally spaced points by screw bolts $d$ which are threaded into the stock $a$ and its stiffening rib $b$, the heads of which hold the flexible band $c$ so as to form any desired curve along its length. Bolts $d$ having shoulders $d'$ are provided with locking nuts $e$. Auxiliary bolts $f$ are provided to prevent the flexible bands from becoming unseated from against the shoulder $d'$. End bolts $f'$ are provided to hold the ends of the flexible band $c$ tight against the stock $a$. Clips $g$ are fastened to stock $a$ approximately at its middle and extend normally perpendicularly thereto. An arm $h$ is mounted between the clips $g$ and is adapted to be secured at variable angles with the stock because of the plurality of holes $i$.

The pin $j$ can be placed thru the hole $k$ in the arm $h$ and thru the holes $i$ in the clips $g$ and thus form a rigid connection between the arm $h$ and the stock $a$. An adjustable screw $l$ is threaded into the extremity of the arm $h$ and is locked in place by a nut $m$.

The arm $h$ is preferably made of a piece of bar iron twisted as at $n$ so that it lies endwise to the surface between the clips $g$ and flatwise at the extremity thru which the adjustable screw is placed. It is also preferably made angular as at $o$ so that the extremity $h'$ approximates parallelism with the surface on which the gauge rests.

The operation is as follows: When the cross cut saw $p$ is in position to be gaged, the desired degree of curvature is set on the gauge by moving the screw $l$ up or down. If the saw assumes a convex surface the gauge is set as in Fig. 4 with a pin $j$ thru the upper hole and if it assumes a concave surface the pin is put thru the lower hole as in Fig. 5. The degree of curvature can be regulated by moving the screw $l$ up or down. The greater the angularity between the stock and flexible plate and the blade $p$ the shorter will be the arc of curvature. If it is desired that the saw shall not be set to a true arc, moving the screws $d$ inwardly or outwardly will cause the plate $c$ to assume any desired curve along its length and thus the maximum degree of tension can be made near the teeth of the saw or otherwise and gaged accordingly with my improved saw gauge.

I claim:

1. A saw gauge of the character described comprising a stock of rigid construction, a flexible band, means for securing the band to the stock at longitudinally spaced points and operable to flex portions of the band along its length to variable curves, and means for tilting the stock at variable angles with a straight surface.

2. A saw gauge of the character described comprising a stock of rigid construction, a flexible band, a series of spaced screw-bolts threaded into said stock and extending thru said band, and nuts on said screw bolts for adjusting the distance between the band and the stock at longitudinally spaced points, whereby the band is flexed to form desired curves along its length, and means for tilting the stock at variable angles with a straight surface.

3. A saw gauge of the character described comprising, a stock of rigid construction, a flexible band, means for securing the band to the stock at longitudinally spaced points and operable to flex portions of the band along its length to variable curves, an arm pivoted to the stock and perpendicular therewith, means for securing the arm at variable angles with the stock, and a screw threaded into the extremity of the arm.

4. A saw gauge of the character described comprising a stock provided with a longitudinal stiffening rib, a flexible band, a series of spaced screw-bolts threaded into said stock and extending thru said band, and nuts on said screw bolts for adjusting the distance between the band and the stock at longitudinally spaced points, whereby the band is flexed to form desired curves along its length, and means for tilting the stock at variable angles with a straight surface.

5. A saw gauge of the character described comprising a stock of rigid construction, a flexible band, a series of spaced screw-bolts threaded into said stock and extending thru said band, and nuts on said screw bolts for adjusting the distance between the band and the stock at longitudinally spaced points, whereby the band is flexed to form desired curves along its length, and means for tilting the stock at variable angles with a straight surface.

6. A saw gauge of the character described comprising a stock provided with a longitudinal stiffening rib, a flexible band, a series of spaced screw-bolts threaded into said stock and extending thru said band, and nuts on said screw bolts for adjusting the distance between the band and the stock at longitudinally spaced points, whereby the band is flexed to form desired curves along its length, an arm pivoted to the stock and perpendicular therewith, means for securing the arm at variable angles with the stock, and a screw threaded into the extremity of the arm.

JERRY RICKER.